United States Patent
Katano et al.

(10) Patent No.: US 9,905,865 B2
(45) Date of Patent: Feb. 27, 2018

(54) FLUID COMPRESSOR AND FUEL CELL VEHICLE

(71) Applicants: Koji Katano, Toyota (JP); Daisuke Masaki, Kariya (JP)

(72) Inventors: Koji Katano, Toyota (JP); Daisuke Masaki, Kariya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/315,406

(22) Filed: Jun. 26, 2014

(65) Prior Publication Data

US 2014/0308589 A1 Oct. 16, 2014

Related U.S. Application Data

(63) Continuation of application No. 13/377,399, filed as application No. PCT/IB2010/000867 on Apr. 19, 2010.

(30) Foreign Application Priority Data

Jun. 10, 2009 (JP) .................................. 2009-139574

(51) Int. Cl.
*H01M 8/04089* (2016.01)
*F04C 29/00* (2006.01)
(Continued)

(52) U.S. Cl.
CPC ..... *H01M 8/04089* (2013.01); *F04C 29/0092* (2013.01); *F04C 29/12* (2013.01);
(Continued)

(58) Field of Classification Search
CPC ......... H01M 8/04223; H01M 8/04776; H01M 8/04111; H01M 8/04089; H01M 2250/20;
(Continued)

(56) References Cited

U.S. PATENT DOCUMENTS 1,635,271 A 7/1927 Hapgood
1,769,153 A 7/1930 Meyer
(Continued)

FOREIGN PATENT DOCUMENTS

CN 1441168 A 9/2003
DE 10062258 A1 8/2001
(Continued)

OTHER PUBLICATIONS

Japanese Patent Office, Partial translation of Notification of Reasons for Refusal, dated Oct. 2, 2012 in Japanese patent application No. 2009-139574, 2 pages.
(Continued)

*Primary Examiner* — Stephen Yanchuk
(74) *Attorney, Agent, or Firm* — Andrews Kurth Kenyon LLP

(57) ABSTRACT

An air compressor as a fluid compressor includes: a suction port and a delivery port provided at upper and lower portions, respectively, of a pump chamber; a suction passage in communication with the inside of the pump chamber via the suction port; a delivery passage in communication with the inside of the pump chamber via the delivery port; and a driving rotor and a driven rotor provided in the pump chamber. At least a part of the suction passage is located below the suction port.

5 Claims, 11 Drawing Sheets

(51) Int. Cl.
*F04C 29/12* (2006.01)
*F04C 18/16* (2006.01)

(52) U.S. Cl.
CPC .......... *F04C 18/16* (2013.01); *F04C 2210/24* (2013.01); *F04C 2210/62* (2013.01); *F04C 2240/102* (2013.01); *F04C 2250/10* (2013.01); *F04C 2280/02* (2013.01); *H01M 2250/20* (2013.01); *Y02T 90/32* (2013.01)

(58) Field of Classification Search
CPC .......... F04C 2250/102; F04C 2250/101; F04C 29/0092; F04C 29/12; F04C 18/16; F04C 2210/24; F04C 2210/62; F04C 2250/10; F04C 2280/02; F04C 2240/102; Y02T 90/32

See application file for complete search history.

(56) References Cited

U.S. PATENT DOCUMENTS

| | | | |
|---|---|---|---|
| 5,921,761 A | | 7/1999 | Eckels |
| 2001/0041280 A1* | | 11/2001 | Mori ................ F01C 11/004 429/437 |
| 2003/0161749 A1 | | 8/2003 | Nachi |
| 2005/0112014 A1 | | 5/2005 | Shiromaru et al. |
| 2006/0105207 A1 | | 5/2006 | Lundberg |
| 2006/0239836 A1* | | 10/2006 | Forster ................ F04C 29/061 417/312 |
| 2006/0263230 A1* | | 11/2006 | Swartzlander ........ F04C 18/084 418/196 |
| 2007/0007060 A1* | | 1/2007 | Ono ........................ B60K 1/04 180/65.31 |
| 2007/0036662 A1 | | 2/2007 | Pesola et al. |
| 2008/0044275 A1 | | 2/2008 | Fujii |
| 2008/0171241 A1 | | 7/2008 | Kaye et al. |
| 2011/0281185 A1 | | 11/2011 | Sridhar et al. |
| 2012/0077104 A1 | | 3/2012 | Katano et al. |

FOREIGN PATENT DOCUMENTS

| | | | |
|---|---|---|---|
| EP | 1340916 | A2 | 9/2003 |
| EP | 1479913 | A2 | 11/2004 |
| JP | 54-039210 | A | 3/1979 |
| JP | 2003-090292 | A | 3/2003 |
| JP | 2005-054614 | A | 3/2005 |
| JP | 2005-180421 | A | 7/2005 |
| JP | 2006-170139 | A | 6/2006 |
| WO | WO2009/103029 | * | 8/2009 |

OTHER PUBLICATIONS

European Patent Office, International Search Report and Written Opinion of PCT/IB2010/000867, dated Mar. 15, 2011, 17 pages.
Office Action issued to U.S. Appl. No. 13/377,399 dated Apr. 24, 2015.
Final Office Action issued to U.S. Appl. No. 13/377,399,dated Oct. 8, 2015.
Office Action dated Nov. 26, 2013, in U.S. Appl. No. 13/377,399.
Final Office Action dated Mar. 27, 2014, in U.S. Appl. No. 13/377,399.

* cited by examiner

FLUID COMPRESSOR AND FUEL CELL VEHICLE

CROSS REFERENCE TO RELATED APPLICATIONS

This application is a continuation of U.S. patent application Ser. No. 13/377,399, filed Dec. 9, 2011, which is a 371 national phase application of PCT/162010/000867 filed Apr. 19, 2010, claiming priority to Japanese Patent Application No. 2009-139574 filed Jun. 10, 2009, the contents of all of which are incorporated herein by reference.

BACKGROUND OF THE INVENTION

1. Field of Invention

The present invention relates to a fluid compressor that includes: an upper port and a lower port that are located at upper and lower portions, respectively, of a pump chamber; an upper passage in communication with the inside of the pump chamber via the upper port; and a lower passage in communication with the inside of the pump chamber via the lower port; and a rotor disposed in the pump chamber, and a fuel cell vehicle that is equipped with the fluid compressor.

2. Description of Related Art

A fuel cell system is contemplated that has a fuel cell stack that generates electric power through an electrochemical reaction between fuel gas, such as a gas containing hydrogen, and oxidation gas, such as air. The fuel cell stack is constituted by stacking a plurality of fuel cell sets, each of which has a membrane-electrode assembly (MEA) that is constituted of an anode, an electrolyte membrane, and a cathode; and separators, for example. That is, each unit fuel-cell cell is constituted by placing an anode and a cathode, respectively, on opposite sides of an electrolyte membrane that is constituted of a polymer ion-exchange membrane. The MEA is then placed between two separators. A fuel cell stack that generates a high voltage is constituted by stacking a plurality of individual unit fuel cells and sandwiching the stack between current collecting plates, insulating plates, and end plates.

In such a fuel cell, fuel gas is supplied to the anodes and oxidation gas is supplied to the cathodes. Then, the fuel gas and oxidation gas undergo an electrochemical reaction to generate electricity.

For example, a vehicle may be equipped with the above described fuel cell system to supply electric power generated by the fuel cell to a driving motor that drives wheels. In this case, the fuel cell is used as an electric power source for the driving motor.

In a fuel cell system, a fluid compressor, such as an air compressor, is used to supply oxidation gas to the fuel cell. Hydrogen off-gas, i.e., hydrogen gas that is discharged from the fuel cell and contains unreacted hydrogen gas, may also be mixed with fresh hydrogen gas in a circulation passage. The mixed hydrogen gas is to be supplied to the fuel cell to improve fuel efficiency. In this case, the fluid compressor is a hydrogen pump, and the hydrogen pump is provided in the circulation passage.

Japanese Patent Application Publication No. 2005-180421 (JP-A-2005-180421) describes a hydrogen compressor that has a pump chamber defined by the inner surface of a pump housing and the inner surface of a bearing block; and two dual-lobe rotors disposed in the pump chamber. A delivery port is formed at the center of the bottom of the pump chamber, and a guide surface is formed in an inverted circular truncated cone shape that slopes downward toward the opening edge of the delivery port. One benefit of the described hydrogen compressor is that water that has been drawn into or condensed in the pump chamber flows out through the delivery port and does not remain on the bottom of the pump chamber.

If a fluid compressor such as the hydrogen pump or air compressor is left in an environment with a temperature below zero, water retained in gaps between the two rotors or between the rotors and the housing may freeze. In this case, the adherence of ice may make a smooth restart of the fluid compressor difficult or even impossible. Also, if ice is formed in recesses of the rotors, the ice may be caught between the rotors when the fluid compressor is restarted and make a smooth start of fluid compressor difficult. In addition, there is room for improvement in terms of minimizing of damage to the rotors.

Generally, a fuel cell system has a oxidation gas flow path to supply air to the fuel cell and to discharge air off-gas, i.e., the air after the reaction, from the fuel cell. When water vapor contained in the air condenses in the oxidation gas flow path, the water may flow from the upstream side or flow (back) from the downstream side into the air compressor, which is located upstream of the oxidation gas flow path. Then, if the air compressor is left in a low-temperature environment, ice may form in the pump chamber of the air compressor. In the case of a fuel cell vehicle equipped with a fuel cell system, due to the temperature difference that generally occurs between the inside and outside of the chamber, water tends to condense as described above. Further, water or snow thrown up when the fuel cell vehicle runs in the rain or on the snow may be drawn in by the air compressor, and freeze within the compressor.

In view of the above, a way to prevent entry of an excessive amount water into a fluid compressor is desirable. In contrast, with the hydrogen compressor described in JP-A-2005-180421, ensuring that the water present in the pump chamber flows smoothly toward the delivery port is taken into account, but preventing the entry of water into the pump chamber is not taken into account. It is also contemplated to increase the output of the motor that drives the rotors or to carry out a scavenging operation to direct a fluid such as air therethrough by driving the fluid compressor at a relatively high rotational speed for a certain period of time after the fuel cell system is shut down, in order to make a restart of the fluid compressor possible even if ice has formed therein and to discharge the water in the fluid compressor. Such a structure, however, may waste energy.

SUMMARY OF THE INVENTION

The present invention prevents the entry of an excessive amount of water into a fluid compressor of fuel cell vehicle.

A first aspect of the present invention relates to a fluid compressor, that includes: a pump chamber; an upper port that is provided at an upper portion of the pump chamber; an upper passage in communication with the inside of the pump chamber via the upper port; a lower port that is provided at a lower portion of the pump chamber; a lower passage in communication with the inside of the pump chamber via the lower port; and a rotor that is provided in the pump chamber and rotates to compress a fluid introduced into the pump chamber through one of the upper port and the lower port and to discharge the compressed fluid through the other of the upper port and the lower port, in which at least a portion of the upper passage is located below the upper port.

According to the fluid compressor, because at least a part of the upper passage in communication with the inside of the pump chamber via the upper port is located below the upper port, even if condensate water has accumulated on the wall surface of the upper passage, the water may be easily discharged to the outside and the entry of an excessive amount of water into the pump chamber from the upper port side may be prevented. Therefore, formation of ice from water that has entered the pump chamber and malfunctions caused by the formation of ice in the pump chamber, such as inability to restart the air compressor smoothly, are less likely to occur.

The pump chamber may be defined within the housing. The upper port and the lower port may be formed through a wall portion of the housing. An upper connection member, to which a pipe is may be connected, may be secured to an upper portion of the housing and the upper passage is defined within the upper connection member. A lower connection member, to which another pipe may be connected, may be secured to a lower portion of the housing and the lower passage is defined within the lower connection member.

According to the fluid compressor described above, in a configuration in which the housing and both the upper and lower connection members are separate components, malfunctions caused by the formation of ice in the pump chamber are less likely to occur.

The upper passage may have a lower edge, which is inclined or curved gradually downward from the upper port side to the pipe connecting end side of the upper passage.

According to the fluid compressor described above, water that has accumulated on the wall surface of the upper passage is easily discharged to the outside.

At least a portion of the upper passage side end of the upper port may be located below the pump chamber side end of the upper port.

According to the fluid compressor described above, water that has accumulated on the wall surface of the upper port is easily discharged to the outside.

At least a portion of the lower passage may be located below the lower port.

According to the fluid compressor described above, even if water has accumulated on the wall surface of the lower passage, the water may be discharged to the outside easily and entry of an excessive amount of water into the pump chamber from the lower port side may be prevented. For example, even if the lower passage is on the delivery side, water that has been discharged from the pump chamber is prevented from flowing back into the pump chamber. Therefore, malfunctions caused by the formation of ice in the pump chamber are much less likely to occur.

The lower port may include a portion that coincides with the lowermost end of the inner surface of the pump chamber, and may extend downward from a bottom surface of the pump chamber or a side wall surface that includes the lowest end.

According to the fluid compressor described above, even if water has entered or condensed in the pump chamber, the water is discharged easily and prevented from remaining in the pump chamber and failures caused by formation of ice in the pump chamber 66 are much less likely to occur.

The upper passage may serve as a suction passage that directs a fluid into the pump chamber through the upper port, and the lower passage may serves as a delivery passage that delivers a fluid from the pump chamber through the lower port.

The lower passage may serve as a suction passage that directs a fluid into the pump chamber through the lower port, and the upper passage may serves as a delivery passage that delivers a fluid from the pump chamber through the upper port.

The rotor may have a spiral ridge. For example, the rotor may be a twisted roots rotor that has a plurality of lobes which are twisted spirally with respect to the axial direction or a screw rotor that has a thread-like ridge.

According to the fluid compressor described above, even when water is present on the rotor, the water easily flows down along the ridge, which makes water less likely to stay on the rotor after the air compressor is stopped.

The fluid compressor may be used to compress a reactant gas for a fuel cell, which generates electric power through a reaction of the reactant gas.

According to the fluid compressor described above, because water is generated during the reaction of the reactant gas, advantage can be obtained due to a structure that at least a portion of the upper passage, which is in communication with the inside of the pump chamber via the upper port, is located below the upper port.

The fluid compressor may be used as an air compressor, which compresses oxidation gas, not hydrogen gas.

A second aspect of the present invention relates to a fuel cell vehicle equipped with a fuel cell system. The fuel cell system includes a fuel cell that generates electric power through the reaction of a reactant gas, and a fluid compressor that compresses the reactant gas. The fluid compressor may be any one of the fluid compressors described above.

According to the fuel cell vehicle of the present invention, because the fuel cell vehicle tends to be left in a low-temperature environment with temperatures below 0° C. and tends to be in a situation where water may enter the air compressor as a result of being driven in the rain or on the snow. The upper passage, in communication with the inside of the pump chamber via the upper port, has advantage can be obtained due to a structure that at least a portion of the upper passage, which is in communication with the inside of the pump chamber via the upper port, is located below the upper port.

The fuel cell vehicle may further comprises a control unit that controls the fluid compressor to drive the rotor if it is determined that a low-temperature condition with a prescribed temperature or lower has continued for a specified period of time after the vehicle has shut down. For example, the control unit rotates the rotor, for example, a few turns.

In fuel cell vehicle as described above, even if water is retained in gaps between the rotors or between the rotors due to surface tension and the housing in the pump chamber and does not flow down after the vehicle is shut down, the rotation of the rotors causes the water to flow down and to be discharged out of the pump chamber easily.

The control unit may control the fluid compressor to rotatably drive the rotor a plurality of times at regular time intervals if it is determined that the temperature of the surrounding environment has not exceeded a threshold temperature for a prescribed period of time after the vehicle has been shut down.

According to the fluid compressor and the fuel cell vehicle of the present invention, excessive entry of water into the fluid compressor can be prevented.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
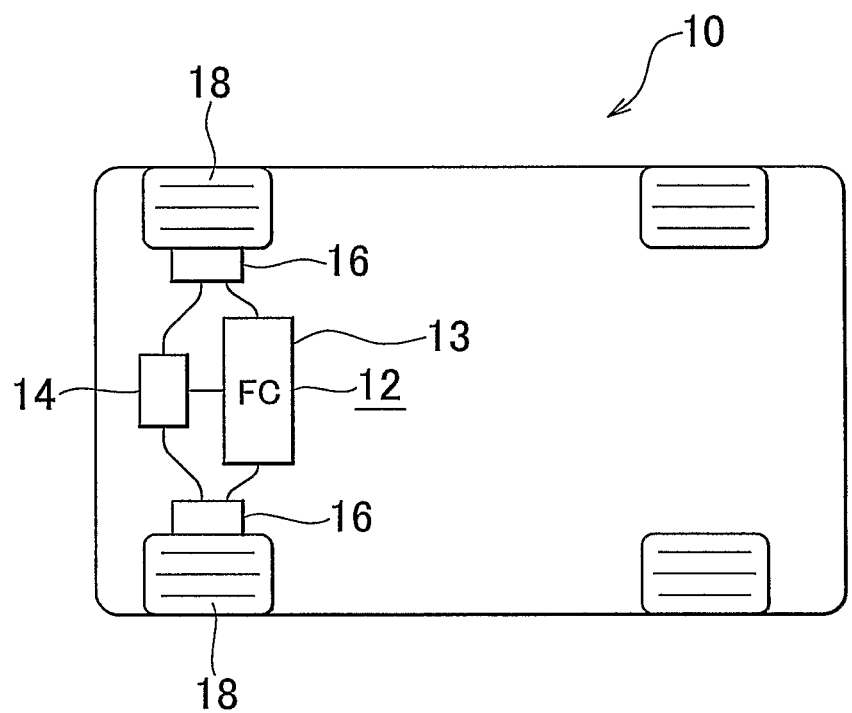
FIG. 1 is a basic configuration of a fuel cell vehicle according to a first embodiment of the present invention.

FIG. 1 through FIG. 7 illustrate a first embodiment of the present invention. FIG. 1 shows the basic configuration of a fuel cell vehicle according to the first embodiment. As shown in FIG. 1, a fuel cell vehicle 10 is equipped with a fuel cell system 12. The fuel cell system 12 includes a fuel cell stack (FC) 13 as a fuel cell. The fuel cell vehicle 10 includes the fuel cell stack 13 and a battery 14, provided at the front of the vehicle, that serves as a secondary battery to store power (left-hand side in FIG. 1). The fuel cell stack 13 is connected to the battery 14 and the electric power generated by the fuel cell stack 13 is supplied to the battery 14 to charge the battery 14. The battery 14 and the fuel cell stack 13 are connected to two driving motors 16 that serve as vehicle driving sources that are located at opposite sides of the vehicle in the lateral direction thereof (the vertical direction of FIG. 1) via a booster converter or inverter (not shown) so that electric power from the battery 14 or the fuel cell stack 13 may be supplied to each driving motor 16. Each driving motor 16 includes a rotating shaft and is respectively coupled to a corresponding wheel 18 via a clutch mechanism (not shown) so that the wheels 18 are driven by the driving motors 16. The fuel cell stack 13 may be indirectly connected to the driving motors 16 so that electric power from the fuel cell stack 13 is supplied to each of the driving motors 16 via the battery 14.

It should be noted that the fuel cell vehicle 10 may instead have only one driving motor 16 and the driving motor 16 may be coupled to transmit power with an axle (not shown) that drives the two wheels 18 via a power transmission mechanism that includes a clutch mechanism. In this case, electric power may also be supplied only from the battery 14 to the driving motor 16. The fuel cell vehicle according to the present invention is not restricted to this configuration, as long as the fuel cell vehicle is equipped with a fuel cell from which electric power can be supplied to at least a driving motor or a power storage device. A fuel cell system that includes a fluid control valve (which is described later) is not restricted to use in a vehicle, and may be used in other applications.

Figure 2:
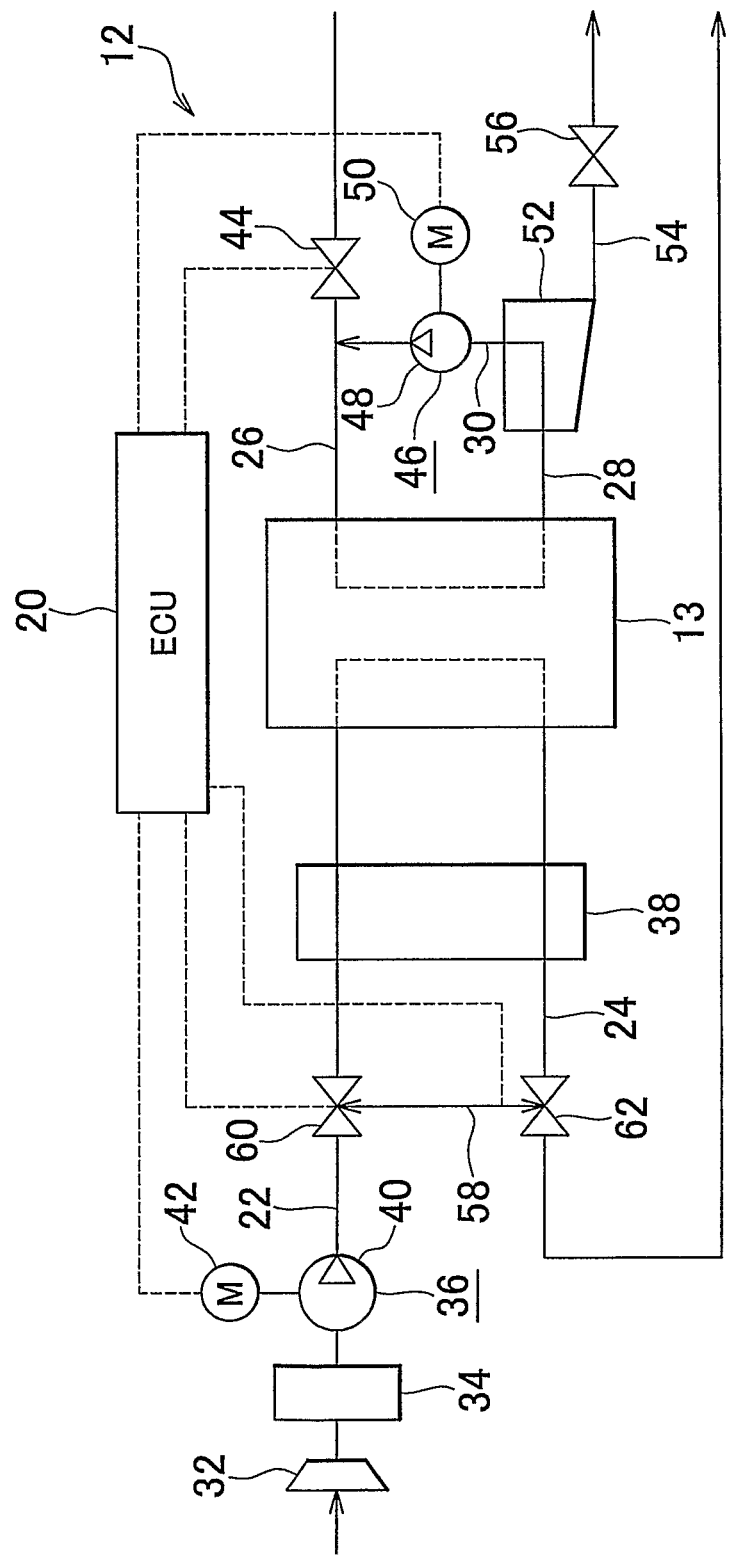
FIG. 2 is a basic configuration of a fuel cell system that includes a fluid control valve of the first embodiment.

The fuel cell system 12 will be described next. As shown in FIG. 2, the fuel cell system 12 includes the fuel cell stack 13; and a control unit 20. The fuel cell stack 13 includes a plurality of unit fuel cells stacked on top of each other, and current collecting plates and end plates at opposite ends of the fuel cell stack 13. The plurality of unit fuel cells, the current collecting plates and the end plates are clamped together with tie rods and nuts or the like. Insulating plates may be provided between the current collecting plates and the end plates.

Although no detailed drawing of each unit fuel cell is given, each unit fuel cell includes, for example, a membrane assembly that is formed by sandwiching an electrolyte membrane between an anode and a cathode; and separators that are disposed on each side of the membrane assembly. A hydrogen-containing fuel gas may be supplied to the anode, and air may be supplied to the cathode. Hydrogen ions that are generated by a catalytic reaction at the anode are transferred to the cathode through the electrolyte membrane, where the hydrogen ions undergo an electrochemical reaction with oxygen to produce water. Also, electrons are transferred from the anode to the cathode through an external circuit to produce an electromotive force. That is, the fuel cell stack 13 generates electric power through an electrochemical reaction between an oxidation gas and a fuel gas.

The fuel cell system 12 includes an oxidation gas supply passage 22 through which air is supplied to the fuel cell stack 13; an oxidation gas-derived gas discharge passage 24 through which air off-gas that is the air (oxidation gas) that has been used for the electrochemical reaction on the cathode of the fuel cell stack 13, is discharged from the fuel cell stack 13; a fuel gas supply passage 26 through which hydrogen gas is supplied to the fuel cell stack 13; a fuel gas-derived gas discharge passage 28 through which hydrogen off-gas that is fuel gas-derived gas, i.e., the hydrogen gas which has been used for the electrochemical reaction on the anode of the fuel cell stack 13, is discharged from the fuel cell stack 13; and a fuel gas circulation passage 30. An air inlet 32, an air cleaner 34 that removes foreign objects from the air, and an air compressor 36 as a fluid control valve are located in an upstream portion of the oxidation gas supply passage 22. The air pressurized by the air compressor 36 is humidified by a humidifier 38 and then supplied to a cathode-side internal passage of the fuel cell stack 13. The air compressor 36 includes a pump 40; and a motor 42. The pump 40 is driven by driving the motor 42, and the driving of the motor 42 is controlled by the control unit 20.

The air off-gas is discharged from the fuel cell stack 13 through the oxidation gas-derived gas discharge passage 24, and then is discharged into the atmosphere through a pressure control valve (not shown) after it has been passed through the humidifier 38. The humidifier 38 also dehumidifies the air off-gas and uses the obtained moisture to humidify the air that is supplied to the fuel cell stack 13.

A fuel gas supply device, such as a high-pressure hydrogen tank (not shown) is located upstream of the fuel gas supply passage 26. Hydrogen gas is supplied from the fuel gas supply device to the fuel cell stack 13 via a fuel gas supply valve 44, which may be an electromagnetic valve.

The hydrogen off-gas, i.e., the hydrogen that has been used for the electrochemical reaction, is discharged from the fuel cell stack 13 through the fuel gas-derived gas discharge passage 28. The hydrogen off-gas also contains unreacted hydrogen. The fuel gas circulation passage 30 is provided to recirculate the hydrogen off-gas that is discharged from the fuel cell stack 13 to the fuel gas supply passage 26 and into the fuel cell stack 13.

A hydrogen pump 46 is provided in the fuel gas circulation passage 30. The hydrogen pump 46 returns the hydrogen off-gas to the fuel gas supply passage 26 through the fuel gas circulation passage 30, and mixes the hydrogen off-gas with hydrogen gas that is supplied from the hydrogen gas source to recirculate the hydrogen off-gas to the fuel cell stack 13. The hydrogen pump 46 includes a pump 48, and a motor 50. The pump 48 is driven by driving the motor 50, and the driving of the motor 50 is controlled by the control unit 20.

A gas-liquid separator 52 is provided at the connection between the fuel gas-derived gas discharge passage 28 and the fuel gas circulation passage 30. A vent and drain passage 54 is connected to the gas-liquid separator 52, and a purge valve 56, which may be an electromagnetic valve, is provided in the vent and drain passage 54. The hydrogen off-gas, which is fed to the downstream side through the gas-liquid separator 52 and the purge valve 56, are mixed with the air off-gas supplied through the oxidation gas-derived gas discharge passage 24 in a diluting device (not shown) to reduce the hydrogen concentration sufficiently and then is discharged to the outside.

The air compressor 36, the hydrogen pump 46, the fuel gas supply valve 44, and the purge valve 56 are connected to the control unit 20. The control unit 20, which is called ECU, outputs control signals to an inverter (not shown) that drives the motor 42 and 50 of the air compressor 36 and the hydrogen pump 46, and outputs control signals to control the opening and closing of the fuel gas supply valve 44 and the purge valve 56.

A starter switch (not shown) that functions as an ignition switch for the fuel cell system 12 is connected to the control unit 20. A power generation starting process is executed when a power generation start signal, that is, a fuel cell activation command signal, is received from the starter switch, and a power generating operation stopping process is executed when a power generation stop signal is received. In other words, the control unit 20 controls power generation in the fuel cell stack 13. The control unit 20 includes a microcomputer that has a CPU, memory and so on.

A bypass passage 58 is provided between the oxidation gas supply passage 22 and the oxidation gas-derived gas discharge passage 24. The bypass passage 58 redirects and discharges air that is fed from the upstream side of the oxidation gas supply passage 22 through the oxidation gas-derived gas discharge passage 24, not through the fuel cell stack 13. An upstream three-way valve 60 is provided at the connection between the oxidation gas supply passage 22 and the bypass passage 58, and a downstream three-way valve 62 is provided at the connection between the oxidation gas-derived gas discharge passage 24 and the bypass passage 58. Each of the three-way valves 60 and 62 is connected to the control unit 20, and the control unit 20 may change the direction of flow through each three-way valves 60 and 62 based on the pressure of the air that is supplied to the fuel cell stack 13 or the like. The upstream three-way valve 60 may selectively direct the air fed through the oxidation gas supply passage 22 to either the fuel cell stack 13 or the bypass passage 58. The downstream three-way valve 62 selectively directs the air fed from the upstream side of the bypass passage 58 to flow downstream or shuts off the flow. As for the triangles that represent a three-way valve in the drawings, a white triangle indicates that the channel is open, and a black triangle indicates that the channel is closed. Therefore, in the configuration that is shown in FIG. 2, no air is fed to the bypass passage 58. Each of the three-way valves 60 and 62 is used to control the pressure of air that is supplied to the fuel cell stack 13. The humidifier 38 may be omitted.

Figure 3:
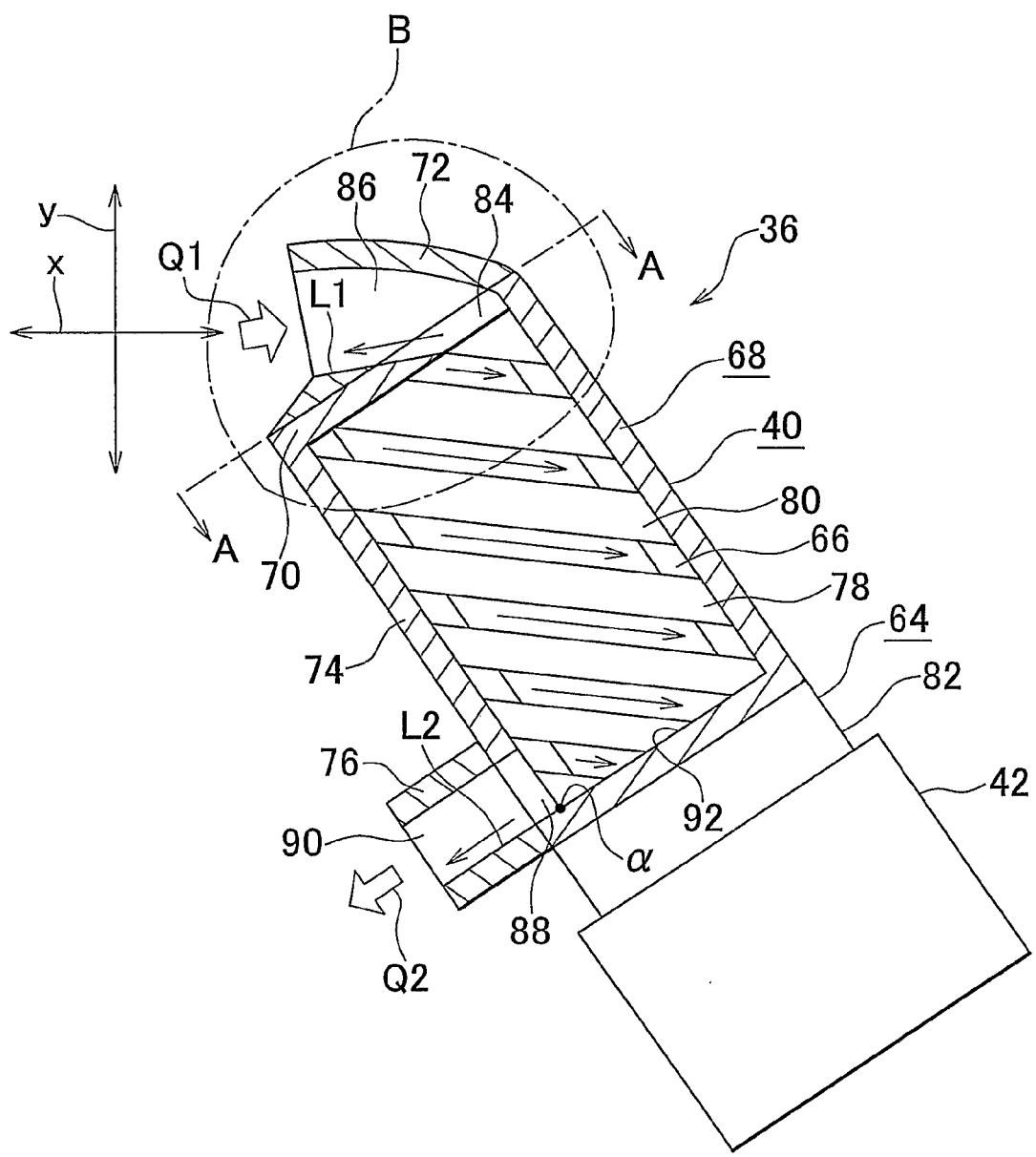
FIG. 3 is a schematic cross-sectional view that illustrates an air compressor shown in FIG. 2.

Referring next to FIG. 3 through FIG. 8, the configuration of the air compressor 36 that serves as the fluid control valve will be described in detail. As shown in FIG. 3, the air compressor 36 is a volume compression, screw type compressor with a body that is inclined with respect to the y-direction, i.e., vertical direction. In the air compressor 36, the motor 42 is coupled to the lower end of the pump 40 via a timing gear 64. The pump 40 has a housing 68 that defines therein a pump chamber 66; a suction duct 72, serving as an upper connection member, that is secured to the upper surface of a top plate 70, which serves as a wall portion of the housing 68; and a delivery duct portion 76, which serves as a lower connection member, that is secured to the lower end of a side wall portion 74 of the housing 68 that extends obliquely downward. In other words, the suction duct portion 72 and the delivery duct portion 76 are secured to upper and lower portions, respectively, of the housing 68. A driving rotor 78 and a driven rotor (not shown) are rotatably supported parallel to each other in the housing 68. The driving rotor 78 has a driving shaft that has a threaded portion 80 formed on its outer peripheral surface. The driving shaft is coupled to the rotating shaft of the motor 42, and is rotated by driving the rotating shaft. The driven rotor has a driven shaft that has a threaded portion formed on its outer peripheral surface as with the driving rotor 78. The timing gear 64 has a gear housing 82 that includes therein two timing gears (not shown). The two timing gears are secured to the lower ends of the driving shaft and the driven shaft, respectively, and are in mesh with each other. The driving shaft and the driven shaft therefore rotate synchronously. The rotating shaft of the motor 42 is coupled to a lower end portion of the driving shaft that extends downward from one of the timing gears. The driving shaft and the driven shaft are inclined with respect to the y-direction and the x-direction, i.e., horizontal direction.

Figure 4:
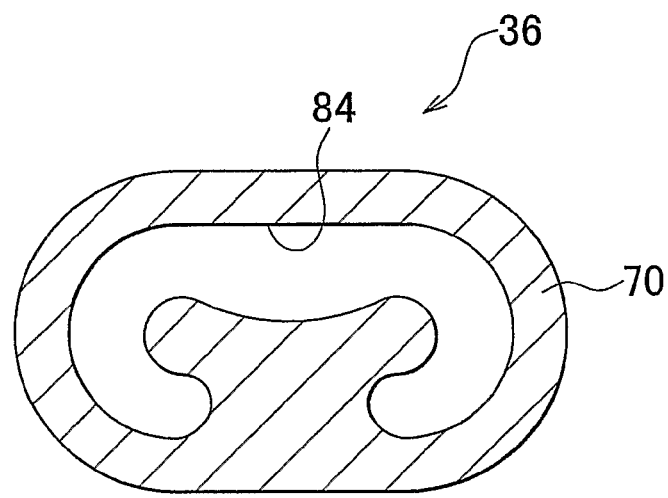
FIG. 4 is a cross-sectional view that is taken along the line A-A of FIG. 3.

A suction port 84, that is an upper port which extends through the top plate portion 70 at the upper end of the housing 68 in the thickness direction thereof, is formed. As shown in FIG. 4, the suction port 84 has a generally C-shaped axial cross-section so as to avoid the rotation support portions (not shown) at the upper ends of the driving shaft and driven shaft. As shown in FIG. 3, the suction duct 72 defines therein a suction passage 86, which serves as an upstream passage, with a first end (left end in FIG. 3) that opens in an end face of the suction duct portion 72 and a second end (right end in FIG. 3) that communicates with the suction port 84. One end of a separate pipe (not shown) may be bolted to the end face (left end face in FIG. 3) of the suction duct portion 72. Accordingly, bolt holes may be provided at the end face of the suction duct portion 72 to receive mounting bolts.

At the lower end of a side wall portion 74 facing the delivery duct portion 76, a delivery port 88, which serves as a lower port, is formed through the side wall portion 74. The delivery duct portion 76 defines therein a delivery passage 90 with a first end (left end in FIG. 3) that opens in an end face of the delivery duct portion 76 and a second end (right end in FIG. 3) in communication with an end of the delivery port 88. One end of another separate pipe (not shown) may be bolted to the end face (left end face in FIG. 3) of the delivery duct portion 76. For example, boltholes may be formed in the end face of the delivery duct portion 76 for receiving mounting bolts. Each of the duct portions 72 and 76 may be provided with a flange, in which boltholes are formed, at the pipe-connecting end of the respective duct portions 72 and 76.

When the rotors 78 rotate, the closed spaces that are defined by the thread grooves between the individual turns of the thread portions of the rotors 78 and the inner surface of the housing 68 move from the suction side to the delivery side in the pump chamber 66, and, while compressing the air that is introduced into the pump chamber 66 through the suction duct portion 72, discharges the compressed air to the outside through the delivery duct portion 76. In this case, the suction passage 86 directs air that is introduced from the upstream side of the pipe connected to the suction duct portion 72 into the pump chamber 66 through the suction port 84. The delivery passage 90 delivers air that has been compressed in the pump chamber 66 to the pipe (not shown) connected to the delivery duct 76.

As shown in detail in FIG. 5, the suction passage side end, i.e., the lower end P1 of the upstream end, of the suction port 84 is located below the pump chamber 66 side end, i.e., the lower end P2 of the downstream end, of the suction port 84. Also, the lower edge L1 of the suction passage 86 along the flow direction is inclined in such a manner as to slope downwardly gradually from the suction port 84 side to the pipe connecting side. In other words, in a cross-section of the suction passage 86 that is taken along the flow direction, the lower edge L1 along the flow direction is inclined downwardly. In addition, at least a part of the suction passage 86 is located below the suction port 84. More specifically, the lower edge L1 of the suction passage 86 extends downward from the lower edge L1A of the suction port 84. The uppermost portion of the bottom of the suction passage 86 is connected to the lower end P1, i.e., the lowermost portion of the suction passage 86 side end, of the suction port 84.

As shown in FIG. 3, a bottom surface 92 (lower end face in FIG. 3) of the pump chamber 66 is a flat surface that extends generally perpendicular to the axial direction of the rotors 78, and the lower edges of the delivery port 88 and the delivery passage 90 along the flow direction are located in a phantom plane that includes the bottom surface 92. The lower edges of the delivery port 88 and the delivery passage 90 are located on a straight line perpendicular to the axis of the rotors 78. The delivery port 88 includes a portion that coincides with the lowermost end a of the inner surface of the pump chamber 66, and extends downward directly from the bottom surface 92 of the pump chamber 66. Therefore, the bottom surface 92 of the pump chamber 66 and the lower edges of the delivery port 88 and the delivery passage 90 are flush with each other. Also, the lower edge L2 of the delivery passage 90 slopes downward gradually from the delivery port 88 to the pipe connecting side. In other words, in a cross-section of the delivery passage 90 that is taken along the flow direction, the lower edge L2 along the flow direction is inclined downward. In addition, at least a part of the delivery passage 90 is located below the delivery port 88.

Figure 6:
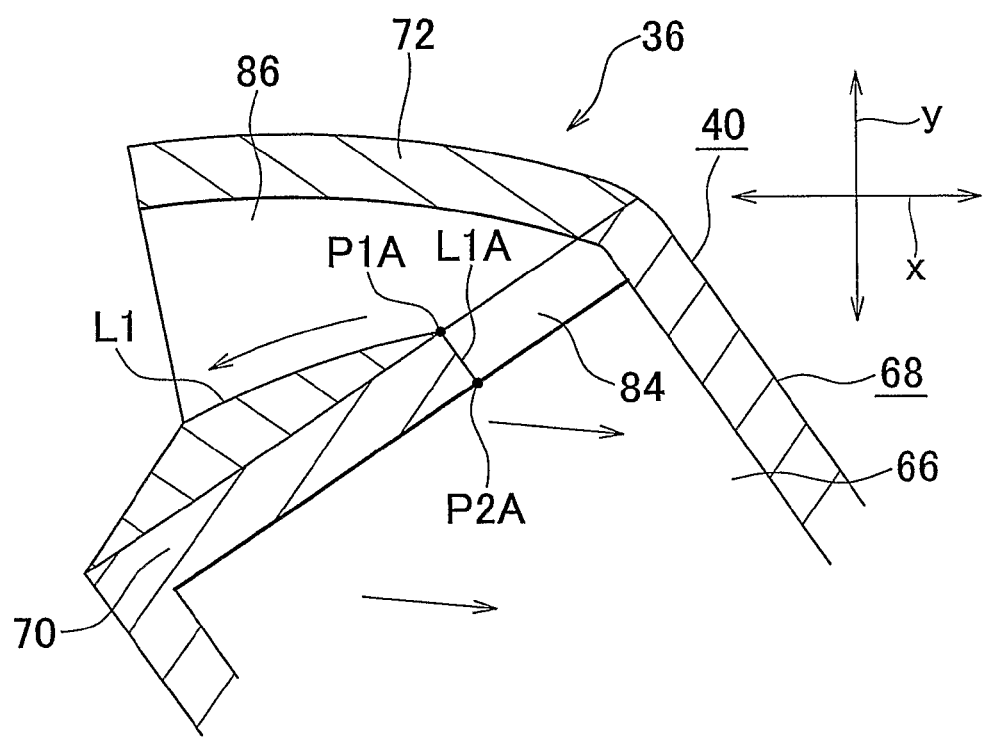
FIG. 6 is a view that corresponds to FIG. 5, which illustrates a second example of a suction duct portion.

The lower edges of the suction passage 86 and the delivery passage 90 may also be curved. For example, FIG. 6 is a view that illustrates a second example of the suction port 84 and the suction duct portion 72. The lower edge L1A of the suction port 84 may extend parallel to the axial direction of one of the rotors such as the driving rotor 78 (see FIG. 3), and the suction passage 86 side end of the suction port 84 is located above the pump chamber 66 side end of the suction port 84. Namely, the lower end P1A of the upstream end of the suction port 84 is located above the lower end P2A of the downstream end of the suction port 84. Also, the lower edge L1 of the suction passage 86 along the flow direction slopes downward gradually from the suction port 84 side to the pipe connecting side. In other words, in a cross-section of the suction passage 86 taken along the flow direction, the lower edge L1 along the flow direction curves downward in an upwardly convex manner. It should be noted, however, that the entirety of the lower edge L1 of the suction passage 86 is not necessarily located below the suction port 84, and the entirety of the lower edge L2 of the delivery passage 90 (FIG. 3) is not necessarily located below the delivery port 88 (FIG. 3).

Figure 5:
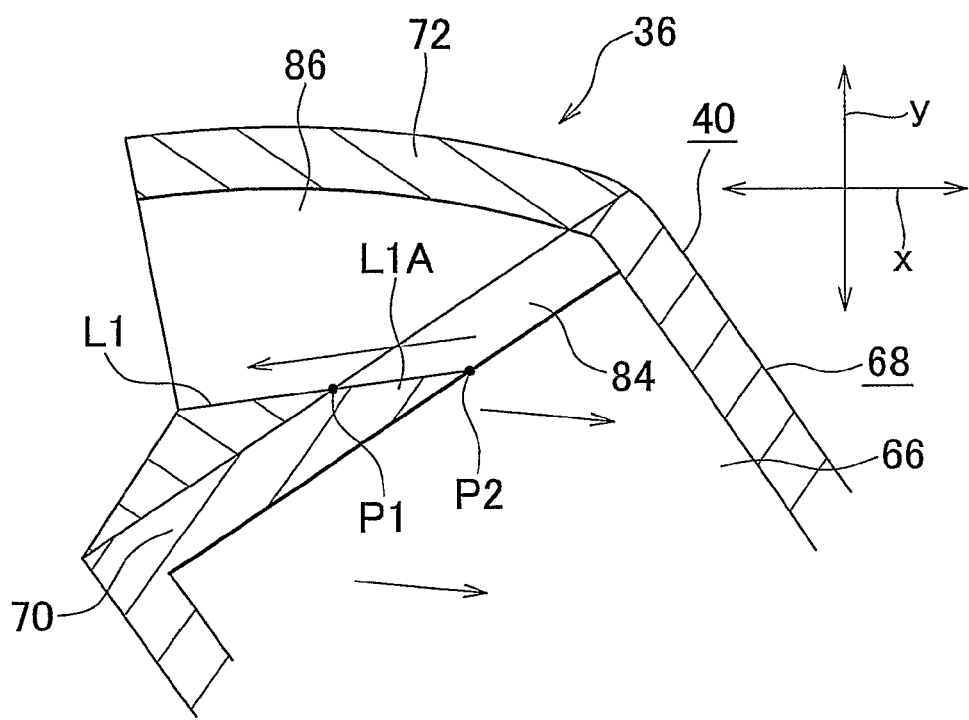
FIG. 5 is a partially simplified, enlarged view of the section B of FIG. 3.
Figure 7:
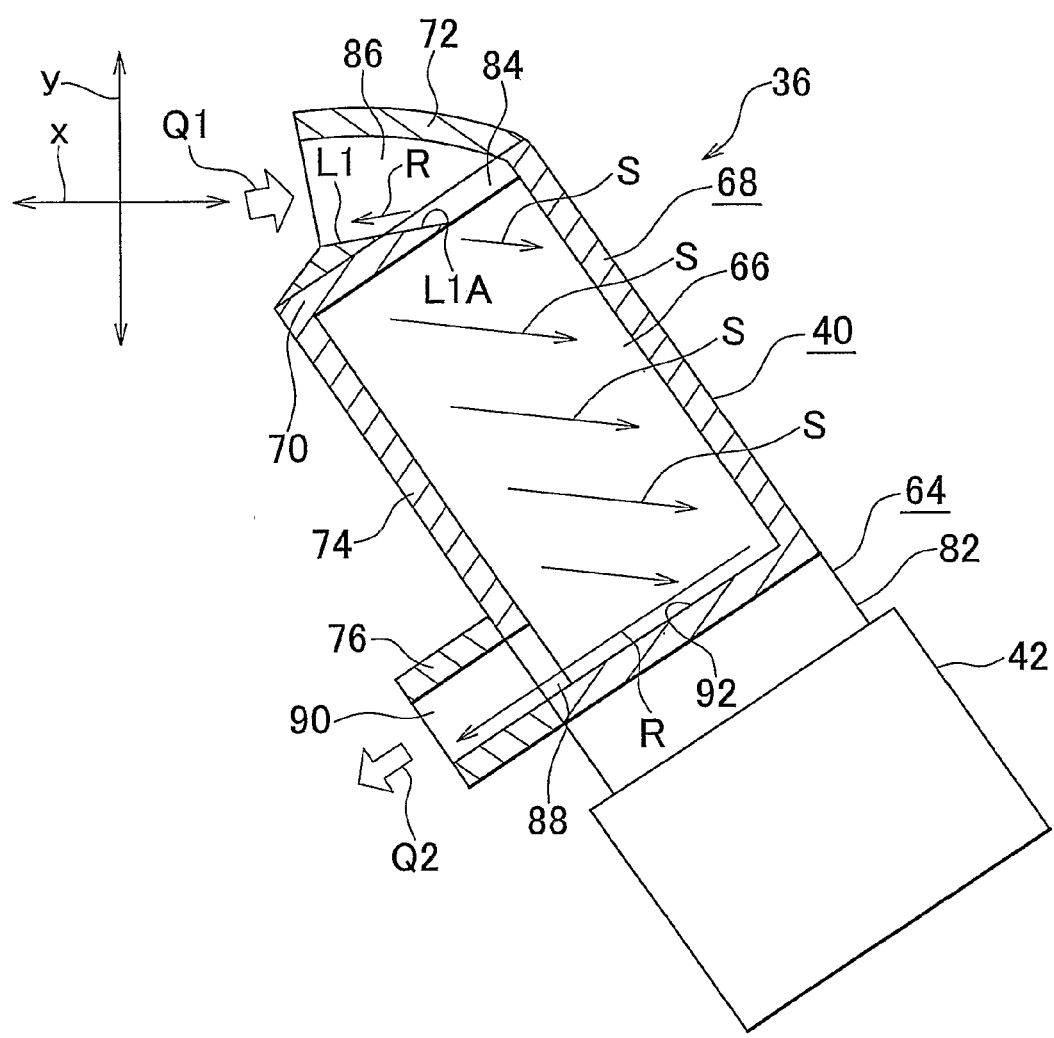
FIG. 7 is a view that corresponds to FIG. 3 except that the rotor is omitted.

In the case of either the air compressor 36 that is shown in FIG. 3 and FIG. 5 or the second example of the air compressor 36 that is shown in FIG. 6, excessive entry of water into the air compressor 36 can be prevented. In this regard, the water entry prevention function of the air compressor 36 shown in FIG. 3 and FIG. 5 is described with reference to FIG. 7. In FIG. 7, the white arrows Q1 and Q2 indicate the direction in which air flows into the air compressor 36 and the direction in which air flows out of the air compressor 36, respectively. Also, the arrows R indicate the direction in which water flows. The arrows S indicate the direction in which water flows down on the driving rotor 78 (see FIG. 3) in the pump chamber 66. Because at least a part of the suction passage 86 is located below the suction port 84 and the lower edge L1 of the suction passage 86 is located below the lower edge L1A of the suction port 84 as shown in FIG. 7, the water that has accumulated on the wall surface of the suction passage 86 flows to the pipe connecting side (leftward in FIG. 7) as indicated by the arrows R, thereby preventing the entry of an excessive amount of water into the pump chamber 66. In addition, even if water has entered the pump chamber 66 or if water has condensed in the pump chamber 66, the water flows on the bottom surface 92 in the pump chamber 66 and is easily discharged to the outside through the delivery port 88 and the delivery passage 90.

Because at least a part of the suction passage 86 in communication with the inside of the pump chamber 66 through the suction port 84 is located below the suction port 84 as described above, even if water, such as condensate water, has accumulated on the wall surface of the suction passage 86, the water may be easily discharged to the outside and entry of excessive water into the pump chamber 66 from the suction port 84 side can be prevented. Therefore, formation of ice from the water that has entered the pump chamber 66 and failures caused by the formation of ice in the pump chamber 66, such as inability to restart the air compressor 36 smoothly, are less likely to occur.

In addition, the pump chamber 66 is defined within the housing 68 and, the suction port 84 and the delivery port 88 are formed through the top plate portion 70 and the side wall portion 74, respectively, each of which forms a part of the housing 68. The suction passage 86 is defined with in the suction duct portion 72, which is secured to an upper portion of the housing 68 and to which a pipe is connectable. The delivery duct portion 76, to which a pipe is connectable, is secured to a lower portion of the housing 68, and the delivery passage 90 is defined within the delivery duct portion 76. Therefore, in a configuration in which the housing 68, the suction duct portion 72, and the delivery duct portion 76 are separate components, failures caused by formation of ice in the pump chamber 66 are less likely to occur. The fluid compressor is not limited to one that has a housing and separate suction duct portion and delivery duct portion, and the suction duct portion and the delivery duct portion may be integrated with a housing that defines therein a pump chamber. In this case, each duct portion protrudes outward from a wall portion that forms part of the housing, and each port is formed through a wall portion and has a length equal to the thickness of the wall portion.

In addition, because the bottom portion of the suction passage 86 is inclined or curved to slope downwardly gradually from the suction port 84 to the pipe connecting side of the suction passage 86, water that has accumulated on the wall surface of the suction passage 86 may be discharged to the outside more effectively.

In the configuration shown in FIG. 5 and FIG. 7, because the lower end P1 (the suction passage 86 side end) of the suction port 84 is located below the lower end P2 (the pump chamber 66 side end) of the suction port 84, water that has accumulated on the wall surface of the suction port 84 can be discharged to the outside more effectively.

In addition, because at least a portion of the delivery passage 90 is located below the delivery port 88, even if water has accumulated on the wall surface of the delivery passage 90, the water may be easily discharged to the outside and entry of an excessive amount of water into the pump chamber 66 from the delivery port 88 side may be prevented. In other words, even if the delivery passage 90 is located below the pump chamber 66, as in this embodiment, water that has been discharged from the pump chamber 66 is prevented from flowing back into the pump chamber 66. Therefore, failures caused by formation of ice in the pump chamber 66 are much less likely to occur.

The delivery port 88 includes the lower edge a (FIG. 3), which is located on the bottom surface 92, and extends downward directly from the bottom surface 92 of the pump chamber 66, without any difference in level. Therefore, even if water has entered or condensed in the pump chamber 66, the water may be easily discharged and prevented from remaining in the pump chamber 66 more effectively and failures caused by formation of ice in the pump chamber 66 are much less likely to occur.

Because each of the driving rotor 78 and the driven rotor has a threaded portion, i.e., a spiral ridge, even if water is present on the rotors 78, the water easily flows down along the thread, which makes water less likely to remain on the rotors 78 after the air compressor 36 is stopped when because the vehicle is shut down.

In addition, because the air compressor 36 is used to compress air, the suction passage 86 has advantage that can be obtained by a structure that a portion of the suction passage 86 is located below the suction port 84.

The fuel cell vehicle of this embodiment, which is equipped with the fuel cell system 12 that includes the air compressor 36 as described above, tends to be left in a low-temperature environment with temperatures below 0° C. and tends to be in a situation where water may enter the air compressor 36 as a result of being driven in the rain or on the snow. Therefore, the bottom of the suction passage 86 in communication with the inside of the pump chamber 66 via the suction port 84 has an advantage which can be obtained by a structure that a portion of the suction passage 86 is located below the suction port 84.

Figure 8:
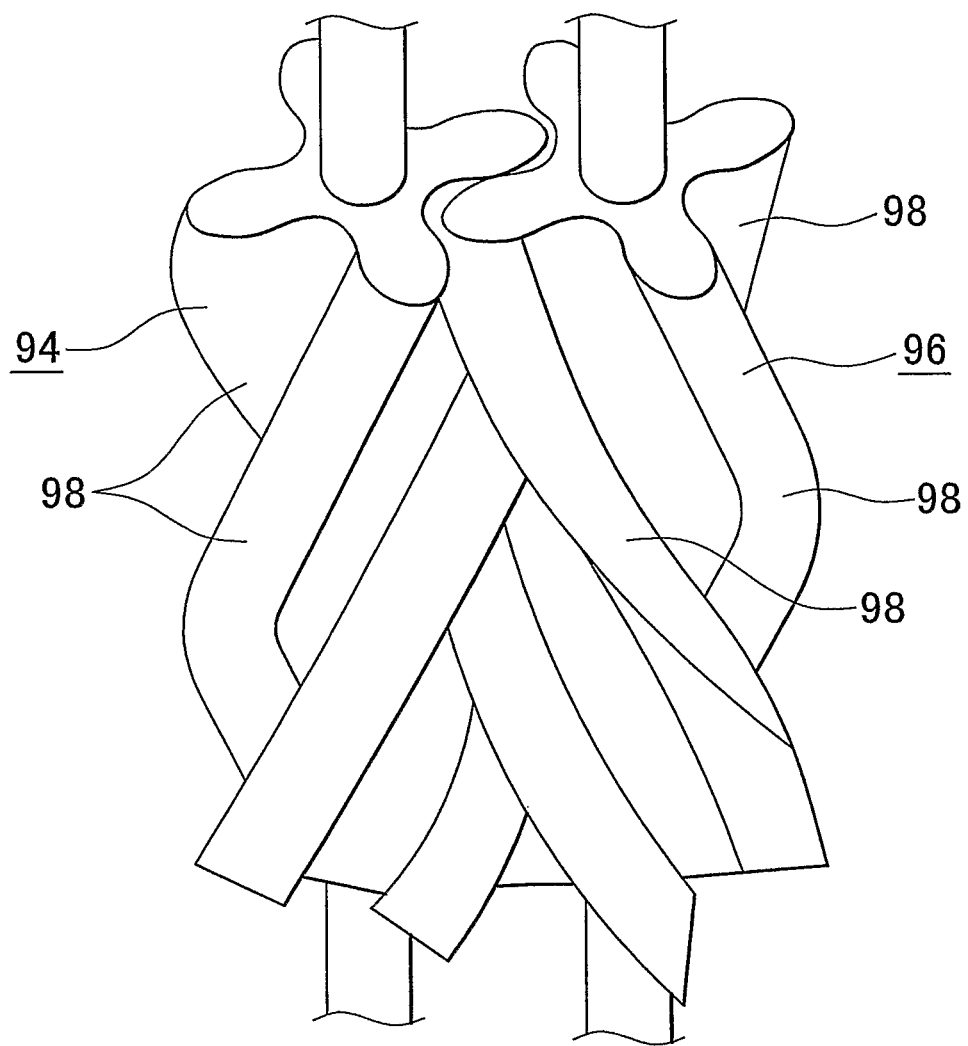
FIG. 8 is a perspective view that illustrates a twisted roots rotors as another example of rotors.

In the above example, a case in which each of the driving rotor 78 and the driven rotor are threaded and the air compressor 36 is a volume compression, screw type compressor has been described. However, the present invention is not restricted to this configuration. For example, the driving rotor 78 and the driven rotor may be twisted roots rotors. FIG. 8 illustrates twisted roots rotors as a second example of the rotors that are included in the air compressor. A driving rotor 94 and a driven rotor 96 that are disposed in the air compressor 36 have a plurality of spiral lobes 98 which are twisted in the same direction with respect to the axial direction. The embodiment that has been described above is applicable to a volume compression, twisted roots type air compressor that uses the rotors 94 and 96.

Figure 9:
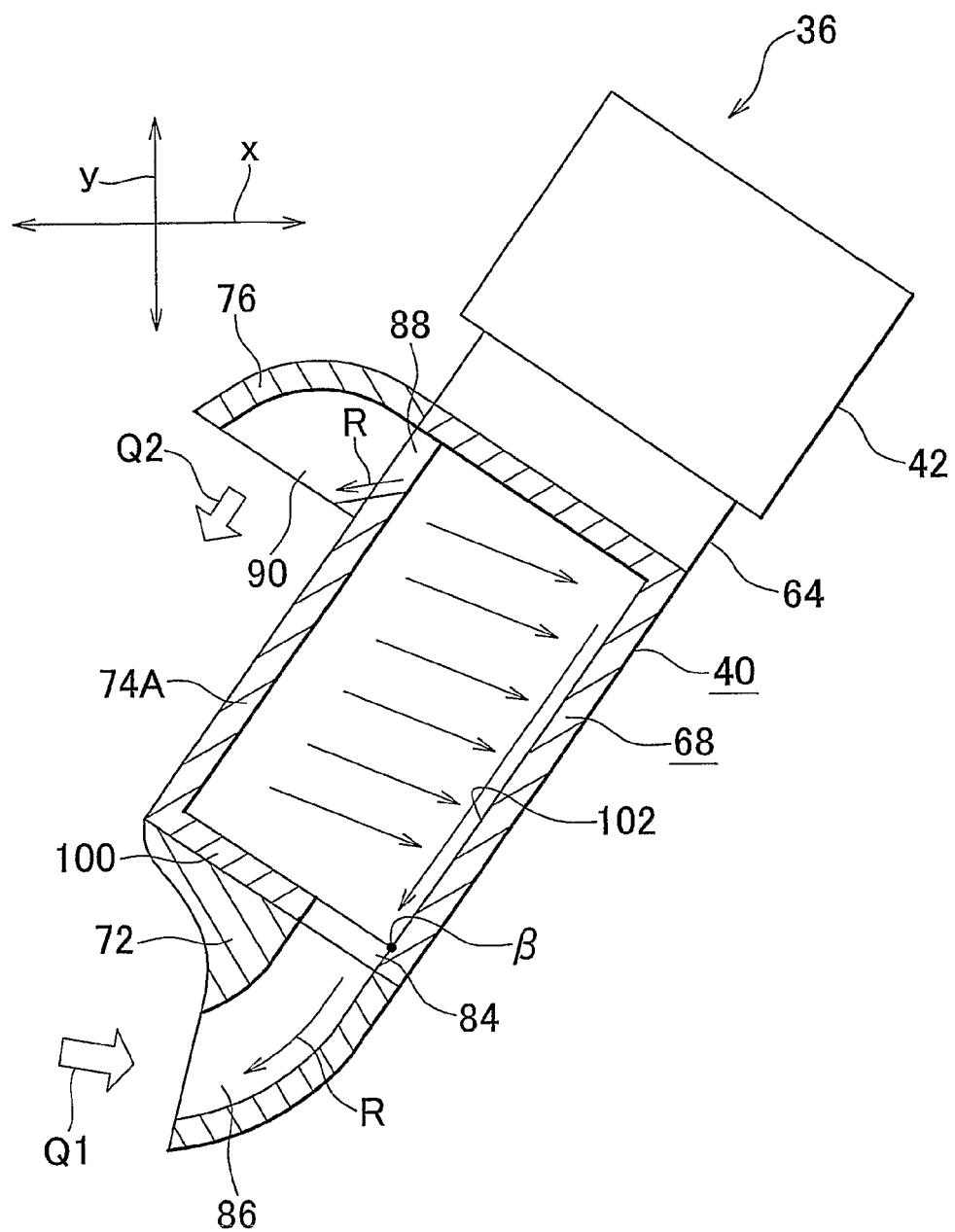
FIG. 9 is a schematic cross-sectional view of an air compressor according to a second embodiment of the present invention.

FIG. 9 illustrates an air compressor according to a second embodiment of the present invention. In the second embodiment, the suction port 84 is located at a lower portion of the housing 68, and the delivery port 88 is located at an upper portion of the housing 68. The suction duct portion 72, which defines therein a suction passage 86, is secured to a lower portion of the housing 68, and the delivery duct portion 76, which defines therein a delivery passage 90, is secured to an upper portion of the housing 68.

That is, with the first embodiment, the air compressor 36 is a volume compression, screw type compressor with a body that is inclined with respect to the y-direction, i.e., vertical direction. In the air compressor 36, the motor 42 is coupled to the upper end of the pump 40 via the timing gear 64. The delivery duct portion 76 serves as an upper connection member of the pump 40 and is secured to the upper end of an upper side wall portion 74A of the housing 68, and the suction duct portion 72 serves as a lower connection member of the pump 40 that is secured to the lower surface of a bottom plate portion 100 of the housing 68. The driving rotor 78 (see FIG. 3) and the driven rotor, each of which has a threaded portion that is formed thereon, are disposed in the housing 68.

The delivery port 88, which is an upper port that extends through the upper side wall portion 74A of the housing 68 in the thickness direction thereof, is formed at the upper end of the upper side wall portion 74A. The delivery duct portion 76 defines therein a delivery passage 90 as an upstream passage that has a first end (right end in FIG. 9) which opens in an end face of the delivery duct portion 76 and a second end (left end in FIG. 9) in communication with an end of the delivery port 88.

The suction port 84, which is a lower port that extends through the bottom plate portion 100, which faces the suction duct portion 72 of the housing 68 in the thickness direction thereof, is formed. The suction duct portion 72 defines therein the suction passage 86 as a downstream passage that has a first end (right end in FIG. 9), which opens in an end face of the suction duct portion 72, and a second end (left end in FIG. 9) in communication with an end of the suction port 84.

The end of the lower edge of the delivery port 88 near the delivery passage 90 in communication with the inside of the pump chamber 66 via the delivery port 88 is lower than the lower edge of the delivery port 88 near the pump chamber 66. The lower edge of the delivery passage 90 along the flow direction slopes downward gradually from the delivery port 88 side to the pipe connecting side (left side in the drawing). In other words, in a cross-section of the delivery passage 90 taken along the flow direction, the lower edge along the flow direction is inclined downwardly. In addition, at least a portion of the delivery passage 90 is located below the delivery port 88.

The suction port 84 includes a portion that coincides with the lowermost end B of the inner surface of the pump chamber 66, and extends downward directly from the inner surface of a side wall surface 102 of the pump chamber 66. Also, the lower edge of the suction passage 86 is curved to slope downward gradually from the suction port 84 side to the pipe connecting side. In addition, at least a portion of the suction passage 86 is located below the suction port 84.

In the embodiment as described above, because at least a portion of the delivery passage 90 is located below the delivery port 88, even if water has accumulated on the wall surface of the delivery passage 90, the water may be easily discharged to the outside and excessive entry of water from the delivery port 88 side into the pump chamber 66 is prevented. In this case, water that has accumulated on the wall surfaces of the delivery port 88 and the delivery passage 90 flows down to the pipe connecting side as indicated by the arrows R and is discharged to the outside easily. In addition, the water that has accumulated on the wall surfaces of the suction port 84 and the suction passage 86 also flows down to the pipe connecting side as indicated by the arrows R and is discharged to the outside easily. Therefore, formation of ice and failures caused by the ice made from water that has entered the pump chamber 66, such as inability to restart the air compressor 36 smoothly, are less likely to occur. The other configuration and effects are the same as those of the first embodiment except that the positional relationships between the delivery port 88 and the delivery passage 90, and the suction port 84 and the suction passage 86 in the vertical direction are opposite. Also in this embodiment, the rotors are not limited to threaded rotos and may be of another type such as a twisted roots type.

Figure 10:
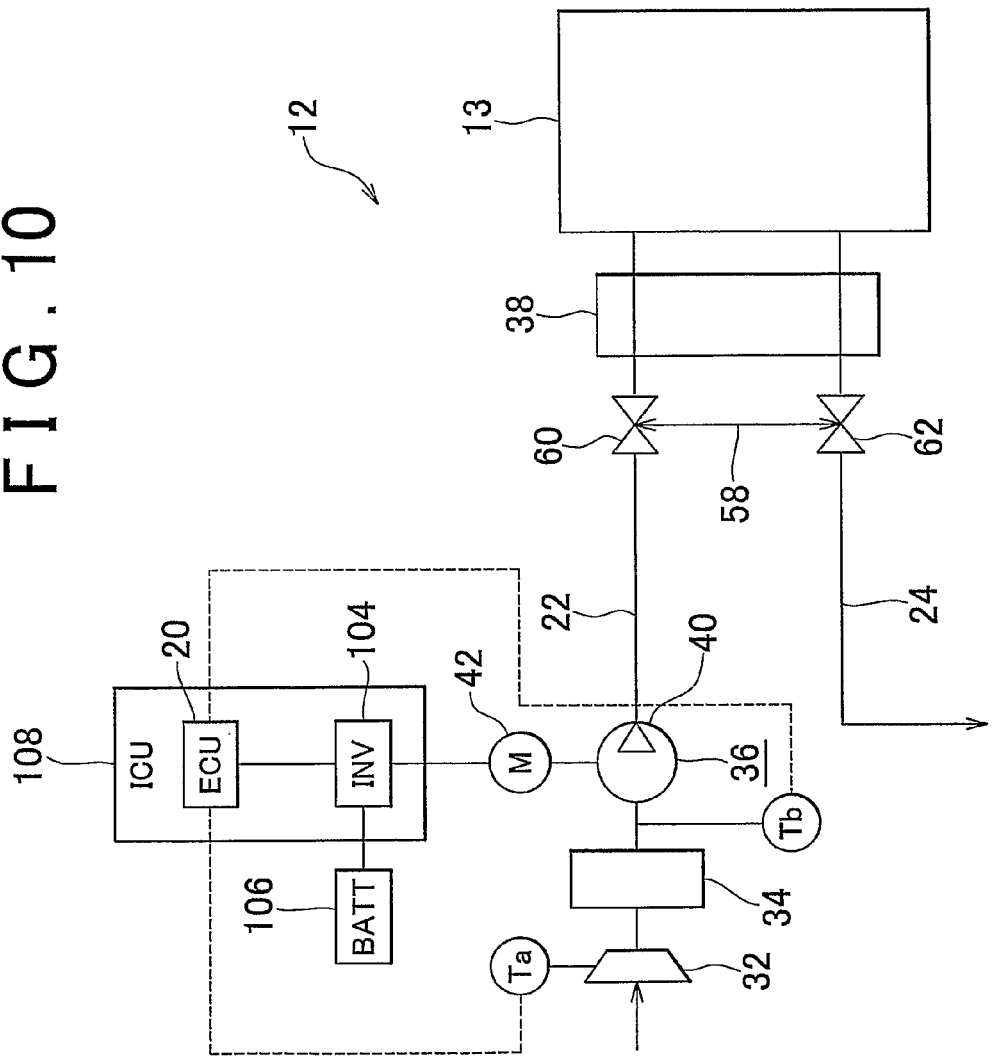
FIG. 10 shows the basic configuration of a fuel cell system that includes a fluid control valve according to a third embodiment of the present invention.
Figure 11:
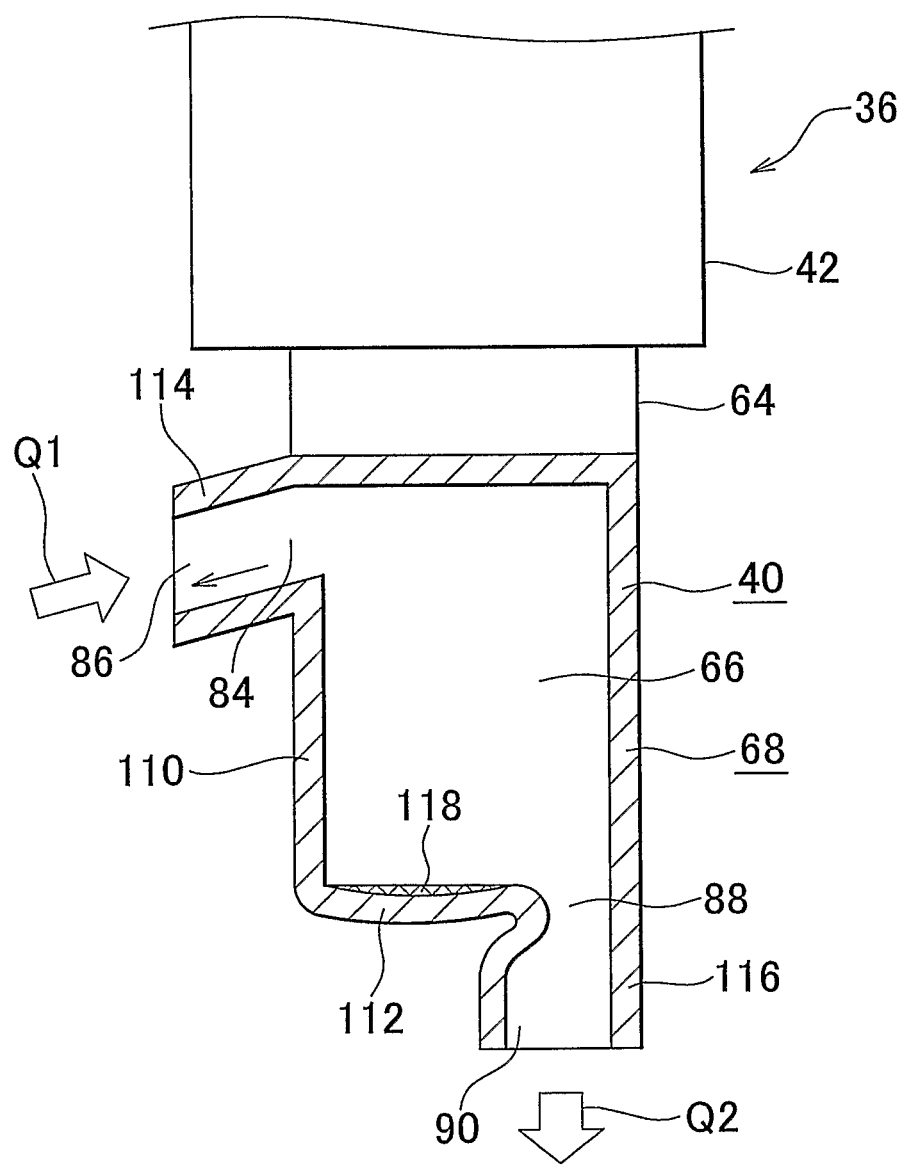
FIG. 11 is a schematic cross-sectional view of the air compressor shown in FIG. 10.
Figure 12:
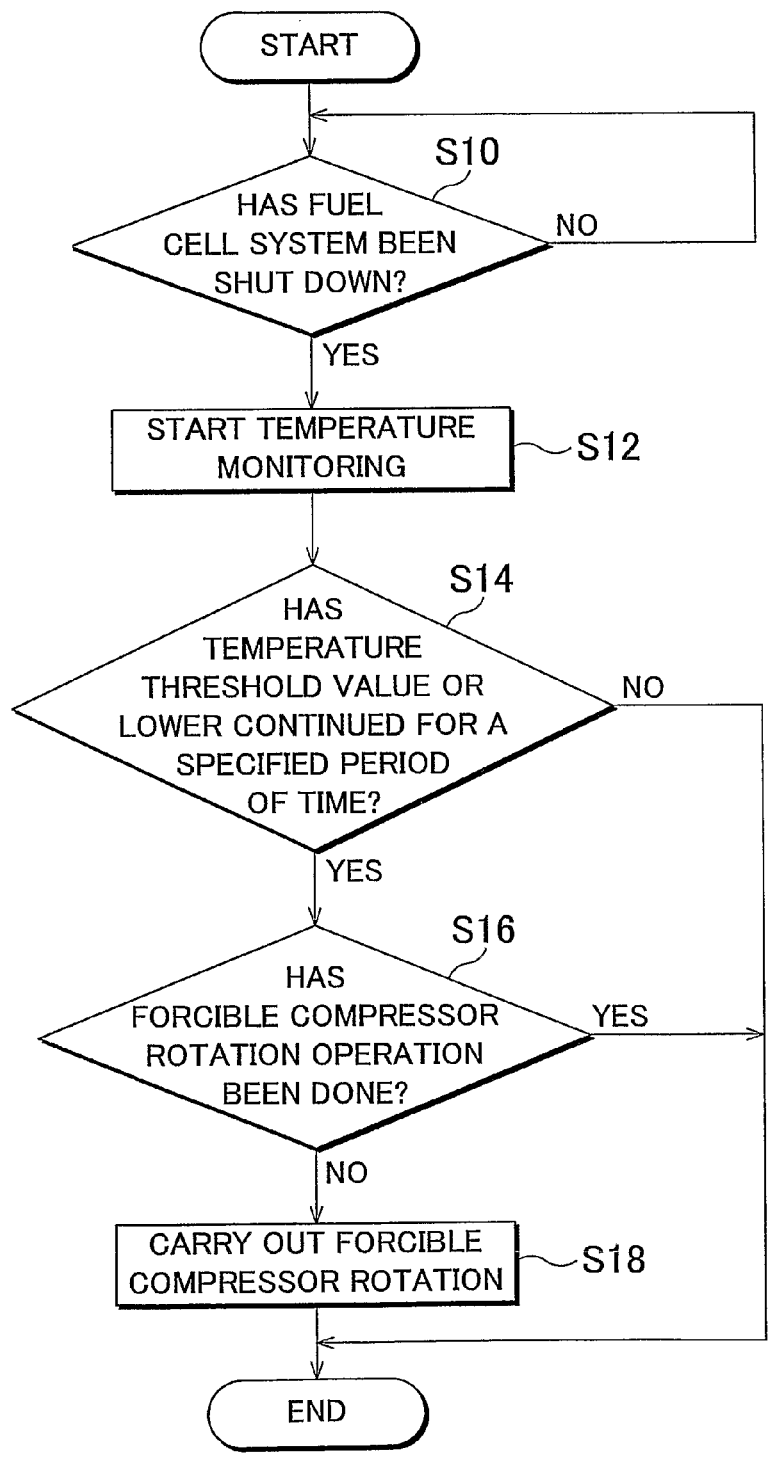
FIG. 12 is a flowchart that shows a method for controlling an air compressor according to the third embodiment after the vehicle is shutdown.

FIG. 10 through FIG. 12 illustrate a third embodiment of the present invention. In the fuel cell system 12 that constitutes a fuel cell vehicle 10 (see FIG. 1) of this embodiment, an inverter 104 connected to a motor 42 that drives a pump 40 of an air compressor 36 so that AC current, converted from DC current provided from the battery 106, may be supplied to the motor 42 as shown in FIG. 10. The inverter 104 is connected to a control unit (ECU) 20, and the ECU 20 outputs control signals to the inverter 104. With this configuration, the ECU 20 controls the motor 42 via the inverter 104. The ECU 20 and the inverter 104 constitute an inverter control unit (ICU) 108. A temperature sensor Ta is provided in air inlet 32 to detect the temperature of air flowing through the air inlet 32. A second temperature sensor Tb is provided between an air cleaner 34 and the air compressor 36 in an oxidation gas supply passage 22 to detect the temperature of air flowing through the oxidation gas supply passage 22. A temperature sensor, which is attached to an air flow meter provided to detect the flow rate in this section, may be used as the second temperature sensor Tb. The temperatures detected by the temperature sensor Ta and the second temperature sensor Tb are input into the control unit 20.

The air compressor 36 is constituted as shown in FIG. 11. In particular, the air compressor 36 is a screw type compressor in which a driving rotor 78 (see FIG. 3) and a driven rotor (not shown), each of which has a threaded portion, are rotatably disposed with the axial direction of the rotors 78 extending vertically. The entire air compressor 36 is disposed along a vertical direction. In the air compressor 36, a motor 42 is coupled to the upper end of a pump 40 via a timing gear 64. The pump 40 has a suction duct portion 114 that protrudes from and is integrated with the upper end of a side wall portion 110 that forms one side (left side in FIG. 11) of a housing 68, and a delivery duct portion 116 that protrudes from and integrated with the lower surface of a bottom plate portion 112 of the housing 68.

A suction port 84 as an upper port that extends through the side wall portion 110 in the thickness direction thereof is formed at the upper end of the side wall portion 110. The suction duct 114 defines therein a suction passage 86, which serves as an upper passage. The suction duct 114 and the suction passage 86 are inclined with respect to the vertical direction with at least a portion of the suction passage 86 located below the suction port 84. The lower edges of the suction port 84 and the suction passage 86 are inclined with respect to the vertical direction.

The delivery port 88, which extends through the housing 68 in the thickness direction thereof, is formed through a portion of the bottom plate portion 112 that faces the delivery duct portion 116 of the housing 68. The delivery duct portion 116 and a delivery passage 90 defined therein generally extend vertically, and the pipe-connecting end of the delivery passage 90 faces downward. In this case, the bottom plate portion 112 is almost located on a horizontal phantom plane. In the air compressor 36, entry of an excessive amount of water into the pump chamber 66 may be prevented by properly defining the positional relationship between the suction port 84 and the suction passage 86. However, if there is a recess that is concave downward or the like in the bottom plate portion 112 of the housing 68 as shown in FIG. 11, a puddle 118 may be formed on the bottom plate portion 112 as shown in FIG. 11 if water enters the pump chamber 66 or water is formed by condensation in the pump chamber 66. With such a configuration, water may freeze if the air compressor 36 is left in a low temperature environment with a temperature below 0° C. The air compressor 36 may be also left in a low-temperature environment with water retained in the small gaps between the two rotors (not shown) or between the rotors and the inner surface of the housing 68 by surface tension. In this case, the water present in the gaps may freeze. The air compressor 36 has room for improvement in terms of the improvement of the starting performance when left in a low-temperature environment. This embodiment overcomes the problem.

In the fuel cell vehicle 10 of this embodiment (see FIG. 1), the control unit 20 controls the air compressor 36 to drive the driving rotor 78 (see FIG. 3) and the driven rotor to rotate, for example, a few turns if it is determined that the temperature has remained equal to or below a threshold temperature for a prescribed period of time after the vehicle is shut down.

FIG. 12 is a flowchart that shows the method for controlling the air compressor 36 after the vehicle is shutdown. First, in step S12, if the control unit 20 determines that the fuel cell system 12 is shut down by, for example, detecting turn-off of the starter switch in step S10, the control unit 20 activates at least one of the temperature sensor Ta and the second temperature sensor Tb to detect the temperature at preset time intervals and stores the detected temperatures. That is, the control unit 20 starts temperature monitoring using the temperature sensor Ta (or Tb).

Then, in step S14, the control unit 20 determines whether the detected temperature has remained equal to or below a threshold temperature, for example, 0° C. or lower, for a prescribed period of time. If it is determined the detected temperature has been equal to or lower than the threshold temperature for at least the prescribed period of time, the process goes to step S16. In step S16, the control unit 20 determines whether the air compressor 36 has been already forcibly rotated after the shutdown of the vehicle. If it is determined that the air compressor 36 has been already forcibly rotated, the process proceeds to step 18, where the control unit 20 drives the motor 42 of the air compressor 36 to forcibly rotate each rotor of the air compressor 36 a few turns.

In contrast, if the control unit 20 determines in step S14 that the detected temperature has not been equal to or below a threshold temperature for at least the prescribed period of time, or determines in step S16 that the air compressor 36 has been already forcibly rotated after the shutdown of the vehicle, the operation of the control unit 20 is terminated.

In this embodiment as described above, even if water is retained in gaps between the two rotors or between the rotors and the housing 68 of the pump chamber 66 by surface tension and does not flow down after shutdown of the vehicle, the rotation of the rotors causes the retained water to flow down and to be discharged out of the pump chamber 66 easily. That is, even a few turns of the rotors may be sufficient to cause the water retained in the gaps to flow down. In addition, the water that has accumulated on the bottom may be easily discharged through the delivery port 88 by through the rotation of the rotors. It should be noted that the control unit 20 may rotatably drive the rotors at a prescribed rotational speed for a specified period of time after the vehicle is shut down in order to use the centrifugal force more effectively.

In addition, because the air compressor 36 is not forcibly rotated again if the air compressor 36 has already been forcibly rotated after shutdown of the vehicle, excessive consumption of the battery 106 may be prevented. However, the determination in step S16 may be omitted and the forcible rotation of the air compressor 36 may be carried out several times if the control unit 20 determines that the electrical charge in the battery 106 is at least equal to a predetermined value. The control unit 20 may drive the rotors at regular time intervals so that the rotors rotate preset plural times each time the control unit 20 drives the rotors if the temperature has remained equal to or below a threshold temperature for at least a prescribed period of time. In the case of these configurations, the water in the air compressor 36 may be discharged to the outside more easily after the vehicle is shut down.

While both temperature sensor Ta and the second temperature sensor Tb are provided in this embodiment, a single temperature sensor may be provided and the detection signals from the single temperature sensor may be input into the control unit 20. Because the other configuration and effects are the same as those of the first embodiment that is shown in FIG. 1 to FIG. 8, similar components are designated by the same reference numerals to omit redundant illustration and description.

While an air compressor 36 with two rotors, the driving rotor 78 and the driven rotor, has been described in each of the above embodiments, the fluid compressor of the present invention may also be applied to an air compressor that has a single rotor. For example, the present invention is applicable to the configuration of a scroll type fluid compressor in which a single spiral rotor is disposed in a housing that includes therein a spiral wall portion.

While the present invention has been described in the context of an air compressor in each of the above embodiments, the present invention is not restricted to such a configuration and is also applicable to, for example, the hydrogen pump 46 (see FIG. 2), which pressurizes and delivers hydrogen off-gas.

What is claimed is:

1. A fuel cell vehicle, comprising:
   a fuel cell that generates electric power through a reaction of a reactant gas; and
   a fluid compressor, coupled to said fuel cell, that compresses the reactant gas, wherein the fluid compressor comprises:
   a pump chamber;
   an upper port that is provided at an upper portion of the pump chamber;
   an upper passage in communication with an inside of the pump chamber via the upper port, wherein the reactant gas is discharged from the pump chamber through the upper port to the fuel cell;
   a lower port that is provided at a lower portion of the pump chamber;
   a lower passage in direct communication with the inside of the pump chamber via the lower port, wherein the reactant gas is sucked directly into the pump chamber through the lower port; and
   a rotor that is provided in the pump chamber and that rotates to compress the reactant gas sucked directly into the pump chamber through the lower port and discharges the condensed reactant gas through the upper port,
   the upper portion is located above the lower portion with respect to a height direction of the fuel cell vehicle,
   at least a part of the lower passage is positioned below the lower port,
   wherein the lower passage is structured so that condensed water formed in the fluid compressor runs from the lower port towards the lower passage, and
   wherein the lower passage is inclined downwardly with respect to the height direction of the fuel cell vehicle such that the condensed water is discharged from the fluid compressor.

2. The fuel cell vehicle according to claim 1, wherein the lower passage slopes downward from the lower port side.

3. The fuel cell vehicle according to claim 1, wherein the upper passage extends away from the side wall of the pump chamber at an angle of less than 90°.

4. The fuel cell vehicle according to claim 1, wherein the lower port is inclined downwardly with respect to a height direction of the fuel cell vehicle.

5. The fuel cell vehicle according to claim 1, wherein the lower passage and the lower port are inclined downwardly with respect to a height direction of the fuel cell vehicle.

* * * * *